United States Patent
Ryon et al.

(10) Patent No.: US 11,753,996 B1
(45) Date of Patent: Sep. 12, 2023

(54) FUEL INJECTOR MANIFOLD HAVING TRIM DEVICE THEREIN

(71) Applicant: Collins Engine Nozzles, Inc., Des Moines, IA (US)

(72) Inventors: Jason A. Ryon, Carlisle, IA (US); Brandon P. Williams, Johnston, IA (US); Andy W. Tibbs, Earlham, IA (US)

(73) Assignee: Collins Engine Nozzles, Inc., Des Moines, IA (US)

( * ) Notice: Subject to any disclaimer, the term of this patent is extended or adjusted under 35 U.S.C. 154(b) by 0 days.

(21) Appl. No.: 17/895,969

(22) Filed: Aug. 25, 2022

(51) Int. Cl.
*F02C 7/232* (2006.01)
*F23R 3/34* (2006.01)
*F02C 7/22* (2006.01)

(52) U.S. Cl.
CPC .............. *F02C 7/232* (2013.01); *F02C 7/222* (2013.01); *F23R 3/34* (2013.01); *F05D 2220/32* (2013.01); *F05D 2230/31* (2013.01); *F05D 2240/36* (2013.01)

(58) Field of Classification Search
CPC .. F02C 7/222; F02C 7/232; F02C 7/22; F23R 3/283; F23R 3/286; F23R 3/28
See application file for complete search history.

(56) References Cited

U.S. PATENT DOCUMENTS

| | | | | |
|---|---|---|---|---|
| 3,043,107 A * | 7/1962 | Magaus, Jr. | ............ | F16H 39/02 60/494 |
| 4,028,888 A * | 6/1977 | Pilarczyk | ................ | F02C 7/222 285/224 |
| 5,319,931 A * | 6/1994 | Beebe | ...................... | F02C 7/228 60/773 |
| 7,269,939 B2 * | 9/2007 | Kothnur | .................. | F23N 5/003 60/739 |
| 8,061,118 B2 * | 11/2011 | Kothnur | .................... | F23R 3/28 60/39.281 |
| 8,776,529 B2 * | 7/2014 | Paradise | ................... | F02C 9/32 60/724 |
| 9,856,836 B2 * | 1/2018 | Pyle | ........................ | F23D 11/26 |
| 10,598,139 B2 * | 3/2020 | Pyle | ........................... | F17D 3/16 |
| 2003/0144787 A1 * | 7/2003 | Davis, Jr. | ................... | F23R 3/28 701/100 |
| 2004/0089276 A1 * | 5/2004 | Memmott | ................ | F02M 7/28 123/527 |
| 2006/0107666 A1 * | 5/2006 | Kothnur | .................. | F02C 7/222 60/773 |

(Continued)

FOREIGN PATENT DOCUMENTS

DE 10018602 A1 10/2001

*Primary Examiner* — Alain Chau
(74) *Attorney, Agent, or Firm* — Locke Lord LLP; Daniel J. Fiorello; Joshua L. Jones (57) ABSTRACT

A fuel injector assembly can include a manifold defining a manifold channel and a nozzle extending from the manifold. The nozzle can be configured to direct flow from the manifold channel into a combustor. The nozzle can define a fuel inlet open to the manifold channel, a fuel outlet configured to be open to a combustor, and a throat fluidly connecting the fuel inlet to the fuel outlet. The assembly can include a trim device inserted into the manifold. The trim device can be configured to adjust flow between the manifold channel and the fuel inlet to adjust flow through the throat and out of the fuel outlet.

7 Claims, 6 Drawing Sheets

(56) References Cited

U.S. PATENT DOCUMENTS

| | | | |
|---|---|---|---|
| 2006/0218925 A1* | 10/2006 | Prociw | F23K 5/06 60/740 |
| 2007/0251952 A1* | 11/2007 | Paradise | F02C 7/228 222/71 |
| 2012/0073301 A1* | 3/2012 | Paradise | F02C 7/232 60/746 |
| 2016/0377039 A1* | 12/2016 | Pyle | F02C 7/222 137/550 |
| 2018/0135576 A1* | 5/2018 | Pyle | F02C 9/28 |

* cited by examiner

FUEL INJECTOR MANIFOLD HAVING TRIM DEVICE THEREIN

FIELD

This disclosure relates to fuel injectors.

BACKGROUND

Additively manufactured internal fuel manifolds (e.g., for turbomachines) allow for connections of tens to hundreds of fuel injectors within gas turbine engines. The fuel injectors can be additively manufactured along with the fuel manifold, which can reduce the number of braze joints to attach the injector tips to the manifold.

However, traditional state of the art additive manufacturing lacks acceptable dimensional tolerances for internal circuit flow passages to allow each injector tip to deliver a uniform flow to the combustor. This results in some injectors flowing more fuel which leads to hot streaks which reduces the life of combustor and turbine components.

Such conventional methods and systems have generally been considered satisfactory for their intended purpose. However, there is still a need in the art for improved fuel injectors. The present disclosure provides a solution for this need.

SUMMARY

In accordance with at least one aspect of this disclosure, a fuel injector assembly can include a manifold defining a manifold channel and a nozzle extending from the manifold. The nozzle can be configured to direct flow from the manifold channel into a combustor. The nozzle can define a fuel inlet open to the manifold channel, a fuel outlet configured to be open to a combustor, and a throat fluidly connecting the fuel inlet to the fuel outlet. The assembly can include a trim device inserted into the manifold. The trim device can be configured to adjust flow between the manifold channel and the fuel inlet to adjust flow through the throat and out of the fuel outlet.

The manifold can include a trim opening configured to receive a trim device inserted therein. The trim opening can be coaxial and/or aligned with the throat of the nozzle.

In certain embodiments, the trim opening can include manifold threads. The trim device can include trim threads configured to mesh with the manifold threads to axially position a plunger of the trim device within the manifold channel by rotating the trim device. In certain embodiments, the plunger of the trim device can include a conical shape.

In certain embodiments, the manifold and/or the trim device can define a seal cavity configured to receive a seal to seal between the trim device and the manifold to prevent flow from leaking through the trim opening. The assembly can include a seal disposed in the seal cavity and sealing a perimeter of the trim device, for example.

In certain embodiments, the trim device can be press-fit into the trim opening. The trim device can include a braze ring cavity for holding a braze ring to allow brazing of the trim device to the manifold. In certain embodiments, an exposed end of the trim device is welded to the manifold.

In certain embodiments, the trim device can include a calibrated orifice that is calibrated to provide a set flow to the throat of the nozzle. The trim device can extend across the manifold channel and insert into a trim device aperture abutting the fuel inlet of the nozzle. The trim device can include one or more radial openings in fluid communication with the calibrated orifice to fluidly communicate the manifold channel to the throat of the nozzle.

In certain embodiments, the calibrated orifice can be precalibrated prior to insertion. In certain embodiments, the calibrated orifice can be abraded using abrasive flow to calibrate while inserted into the manifold.

In accordance with at least one aspect of this disclosure, a fuel injector structure can include a manifold defining a manifold channel and having a trim opening in fluid communication with the manifold channel. The trim opening can be configured to receive a trim device inserted therein. The manifold can include any suitable manifold as disclosed herein, e.g., as described above. The fuel injector structure can include a nozzle integrally formed with and extending from the manifold. The nozzle can include any suitable nozzle as disclosed herein, e.g., described above.

In certain embodiments, the trim opening can be positioned on an opposite side of the manifold channel relative to the fuel inlet. For example, the trim opening can be coaxial and/or aligned with the throat of the nozzle. The trim opening can include manifold threads configured to mesh with trim device threads of a trim device.

In accordance with at least one aspect of this disclosure, a method can include trimming flow between a fuel manifold channel and a fuel inlet of a fuel injector. The method can include advancing and/or retracting a trim device in the manifold channel to change a flow area between the fuel manifold channel the fuel inlet.

These and other features of the embodiments of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
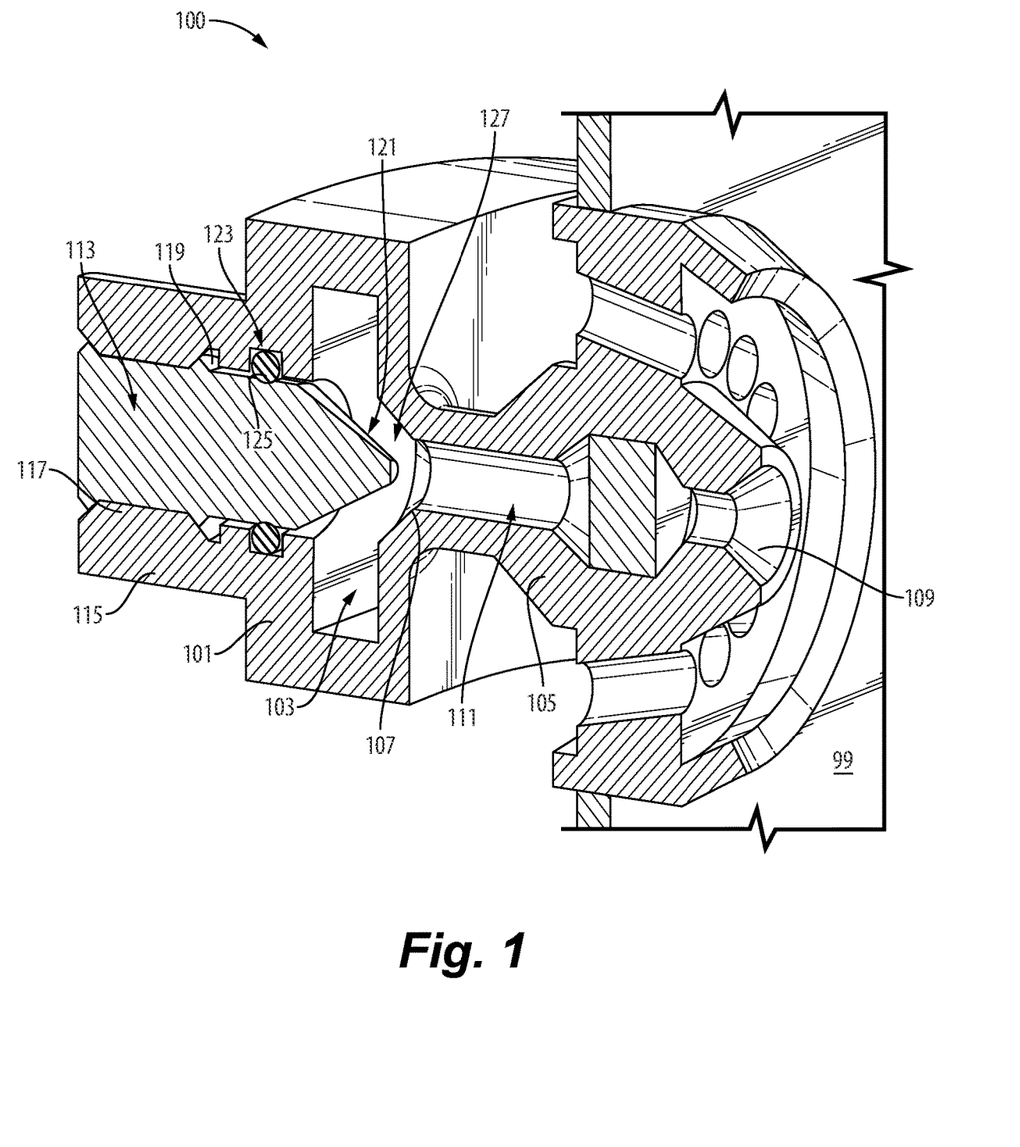
FIG. 1 is a cross-sectional view of an embodiment of a fuel injector assembly in accordance with this disclosure, shown integral with a manifold and disposed in a combustor.

Reference will now be made to the drawings wherein like reference numerals identify similar structural features or aspects of the subject disclosure. For purposes of explanation and illustration, and not limitation, an illustrative view of an embodiment of a fuel injector assembly in accordance with the disclosure is shown in FIG. 1 and is designated generally by reference character 100. Other embodiments and/or aspects of this disclosure are shown in FIGS. 2-5.

In accordance with at least one aspect of this disclosure, referring to FIG. 1, a fuel injector assembly 100 can include a manifold 101 defining a manifold channel 103, and a nozzle 105 extending from the manifold 101. The nozzle 105 can be configured to direct flow from the manifold channel 103 into a combustor 99.

The nozzle 105 can define a fuel inlet 107 open to the manifold channel 103, a fuel outlet 109 configured to be open to a combustor 99, and a throat 111 fluidly connecting the fuel inlet 107 to the fuel outlet 109. The assembly 100 can include a trim device 113 (e.g., a plug) inserted into the manifold 101. The trim device 113 can be configured to adjust flow between the manifold channel 103 and the fuel inlet 107 to adjust flow through the throat 111 and out of the fuel outlet 109.

The manifold 101 can include a trim opening 115 configured to receive a trim device 113 inserted therein. The trim opening 115 can be coaxial and/or aligned with the throat 111 of the nozzle 105, e.g., as shown. For example, the trim opening 115 can extend forward from the manifold 101 and be in fluid communication with the manifold channel 103.

In certain embodiments, the trim opening 115 can include manifold threads 117. The trim device 113 can include trim threads 119 configured to mesh with the manifold threads 117 (e.g., as shown) to axially position a plunger 121 of the trim device 113 within the manifold channel 103 by rotating the trim device 113. In certain embodiments, the plunger 121 of the trim device 113 can include a conical shape (e.g., as shown in FIGS. 1 and 2).

In certain embodiments, the manifold 101 and/or the trim device 113 can define a seal cavity 123 (e.g., an annular aperture) configured to receive a seal 125 to seal between the trim device 113 and the manifold 101 to prevent flow from leaking through the trim opening 115. The assembly 100 can include a seal 125 disposed in the seal cavity 123 and sealing a perimeter of the trim device 113 (e.g., as shown), for example.

The trim device 113 can be configured to partially define and change the size of a passage 127 between the fuel inlet 107 and the manifold 101. As shown, the passage 127 can include a complimentary shape to the plunger 121. However, any suitable shape (e.g., a flat vertical wall of the manifold channel 103 that meets the inlet 107, a ramp shape, etc.) for the passage 127 is contemplated herein. The passage 127 can thus be defined between the manifold 101, inside the manifold channel 103, and the plunger 121 at a location of the fuel inlet 107.

Figure 2:
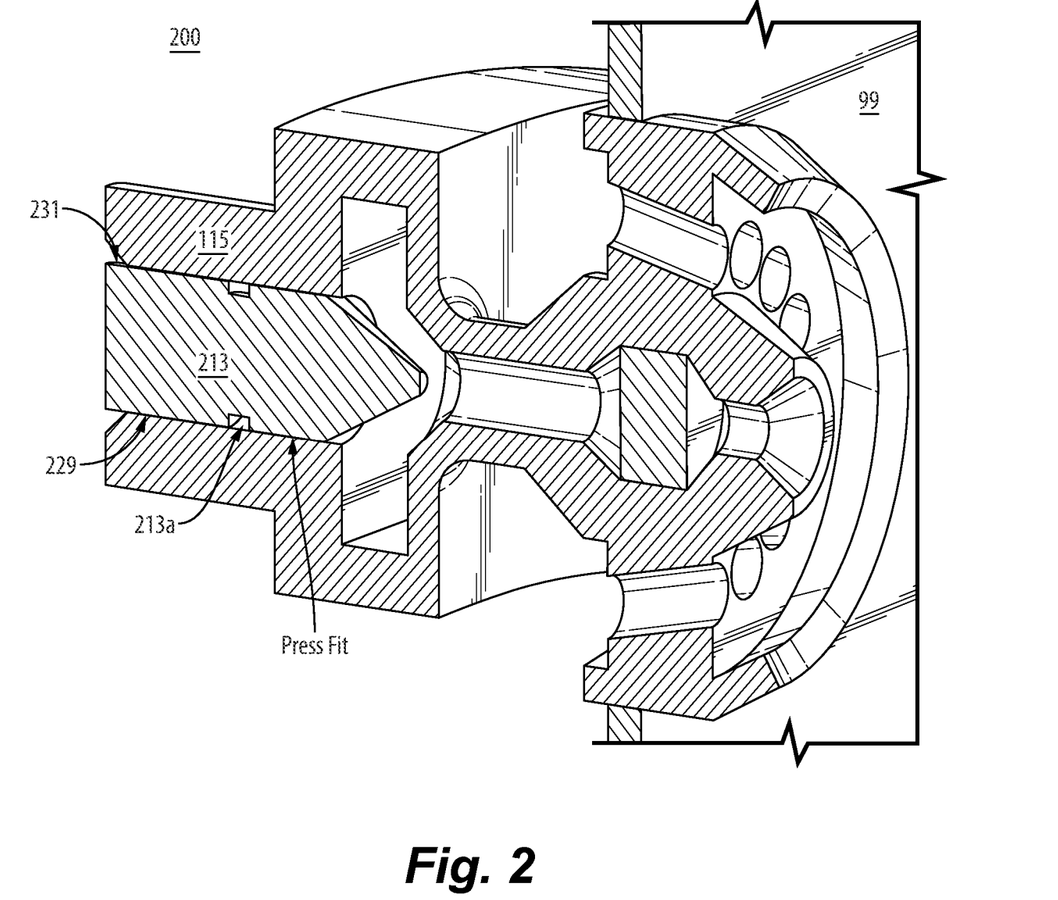
FIG. 2 is a cross-sectional view of an embodiment of a fuel injector assembly in accordance with this disclosure, shown integral with a manifold and disposed in a combustor.

In certain embodiments, referring to FIG. 2, an assembly 200 can include a trim device 213 that can be press-fit into the trim opening 115. The trim device 213 can include a braze ring cavity 213a for holding a braze ring (not shown) to allow brazing of the trim device 213 to the manifold 101 (e.g., to the trim opening 115). For example, the trim device 215 and/or the trim opening 115 may be dimensioned to leave a braze gap 229 between the trim device 213 and the trim opening 115. In certain embodiments, an exposed end of the trim device 213 can be welded to the manifold 101 at a weld location 231 (e.g., in addition to or instead of brazing).

Figure 3:
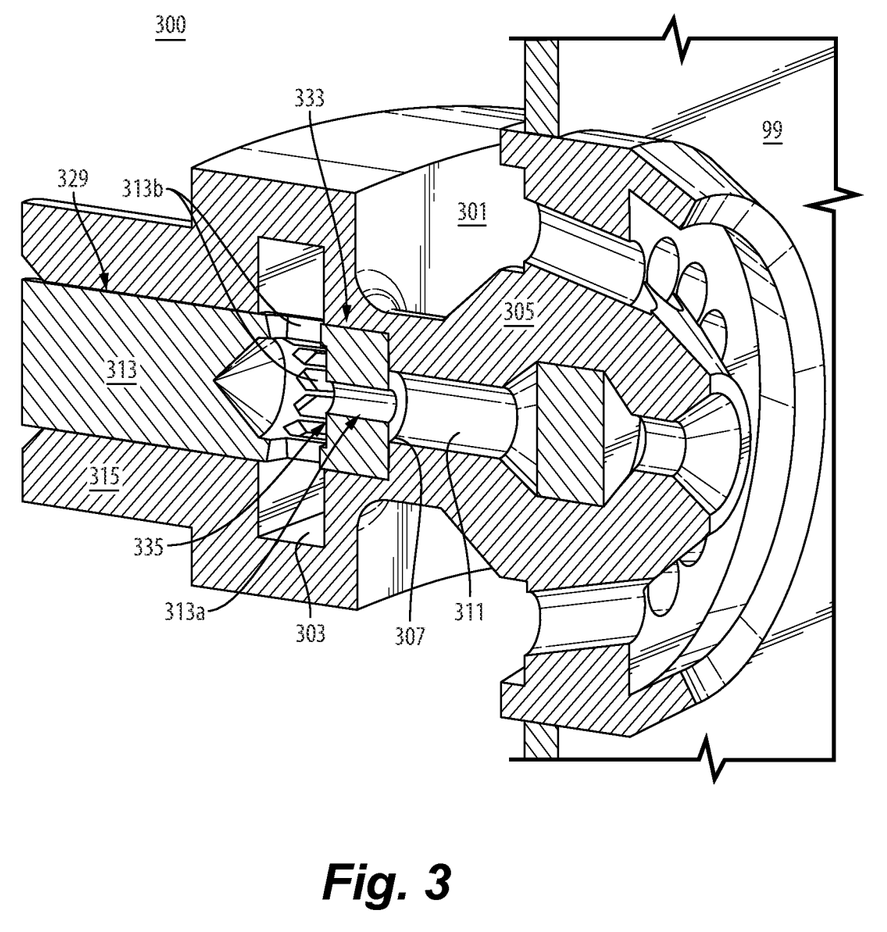
FIG. 3 is a cross-sectional view of an embodiment of a fuel injector assembly in accordance with this disclosure, shown integral with a manifold and disposed in a combustor.

In certain embodiments, referring to the assembly 300 of FIG. 3, the trim device 313 can include a calibrated orifice 313a that is calibrated to provide a set flow to the throat 311 of the nozzle 305. The trim device 313 can extend across the manifold channel 103 and insert into a trim device aperture 333 abutting the fuel inlet 307 of the nozzle 305. The trim device 313 can include one or more radial openings 313b in fluid communication with the calibrated orifice 313a to fluidly communicate the manifold channel 303 to the throat 311 of the nozzle 305. The trim device 313 can be press fit into the aperture 333 and/or brazed to the manifold 301 (e.g., to the trim opening 315 at a braze joint 329).

In certain embodiments, the calibrated orifice 313a can be precalibrated prior to insertion. In certain embodiments, the calibrated orifice 313a can be abraded using abrasive flow to calibrate while inserted into the manifold (e.g., by abrading an inlet corner 335 of the orifice 313a).

In accordance with at least one aspect of this disclosure, a fuel injector structure (e.g., the manifold 101 and nozzle 105) can include a manifold 101, 301 defining a manifold channel 103, 303 and having a trim opening 115, 315 in fluid communication with the manifold channel 103, 303. The trim opening 115, 315 can be configured to receive a trim device (e.g., devices 113, 313 inserted therein. The manifold 101, 301 can include any suitable manifold as disclosed herein, e.g., as described above. The fuel injector structure can include a nozzle 105, 305 integrally formed with and extending from the manifold 101, 301, for example. The nozzle 105, 305 can include any suitable nozzle as disclosed herein, e.g., described above.

In certain embodiments, the trim opening 115, 315 can be positioned on an opposite side of the manifold channel 103, 303 relative to the fuel inlet 107, 307. For example, the trim opening 115, 315 can be coaxial and/or aligned with the throat 111, 311 of the nozzle. In certain embodiments, the trim opening 115, 315 can include manifold threads 117 configured to mesh with trim device threads 119 of a trim device 115, for example. The manifold 101, 301 can include any other suitable features disclosed herein or otherwise (e.g., seal channel 123).

In accordance with at least one aspect of this disclosure, a method can include trimming flow between a fuel manifold channel and a fuel inlet of a fuel injector. The method can include advancing and/or retracting a trim device in the manifold channel to change a flow area between the fuel manifold channel the fuel inlet.

Flow passages in fuel nozzles can be very small, e.g., 10 thousandths of an inch. Manufacturing (e.g., using additive manufacturing) can cause variation and surface roughness on the order of this size, so fuel may flow faster and slower through different nozzles of the same make. Another issue is manifold flow distribution which can change based on the design of the manifold (e.g., terminated end with deadheading, full circle with dead spots, etc.).

Embodiments can include trim plugs that can insert into the manifold at a location of nozzles (e.g., the manifold and nozzles can be one piece). In certain embodiments, the trim plugs can screw into a boss of the manifold. Thus, the manifold can have another opening at each nozzle location in order to allow a trim device to be inserted. Such threaded embodiments can also include a seal (e.g., an o-ring), and can be advanced to change gap size to get a desired flow. After getting to desired flow, the trim device can be spot welded on a back side to the manifold, or otherwise fixed in place (e.g., a through screw).

A method of calibration can include threading a trim plug into the manifold boss, pumping fluid into the fuel manifold, and measuring the fluid flow rate comparing the measured flow rate to the flow target. This can be done by blocking other fuel injector flows to measure one injector at a time. Alternatively, it can be done by measuring the mass flow rate of the injector which is needing measured independently of the others (catching the output fluid flow rate). If the flow rate for any given injector needs to be adjusted to hit the flow target, the method can include adjusting the trim plug (e.g., threading in more or threading out more) so that a plunger restricts the flow passage or opens up the flow passage as needed to meet the desired flow. This adjustment can occur during flowing of the fluid through the manifold and injector, or after the flow is shutoff, for example. Once the flow target is adjusted and hits the target flow rate, the trim plug can be locked in place (e.g., tack weld, staking, or other suitable means to keep the plug from rotating out or in).

In certain embodiments, the trim plug can be pressed in. Such embodiments may be more economical and can have no temperature limits due to not requiring a seal component. In this case the trim plug can have of a tight fit where the trim plug is pressed into the manifold boss to adjust the flow. Once the desired flow is reached, then the trim plug can be fixed into place by brazing and/or welding it, for example.

In certain embodiments, the trim plug can have a precalibrated orifice that can be machined to be high quality and to have a set flow. Additionally, abrasive fluid can be used before inserting or after insertion to ensure the orifice has a certain flow (e.g., the abrasive flow can eat away at the inlet corner and/or inner diameter of the orifice). Embodiments can include varying size precalibration orifices that can be inserted and tested to see which size is needed. Embodiments can include flowing while in the manifold or in a mock manifold to see total flow, or each nozzle could be tested individually. The precalibration can be done through conventional means like drilling the orifice to the proper flow. Or they can be precalibrated using an abrasive flow technique where fluid is flowed through the orifice and erodes away the inlet corner or inner diameter of the orifice until the desired flow is met. In certain embodiments, a flow passage of a plug can be integrally built with the manifold and nozzle, and then abraded.

Figure 4A:
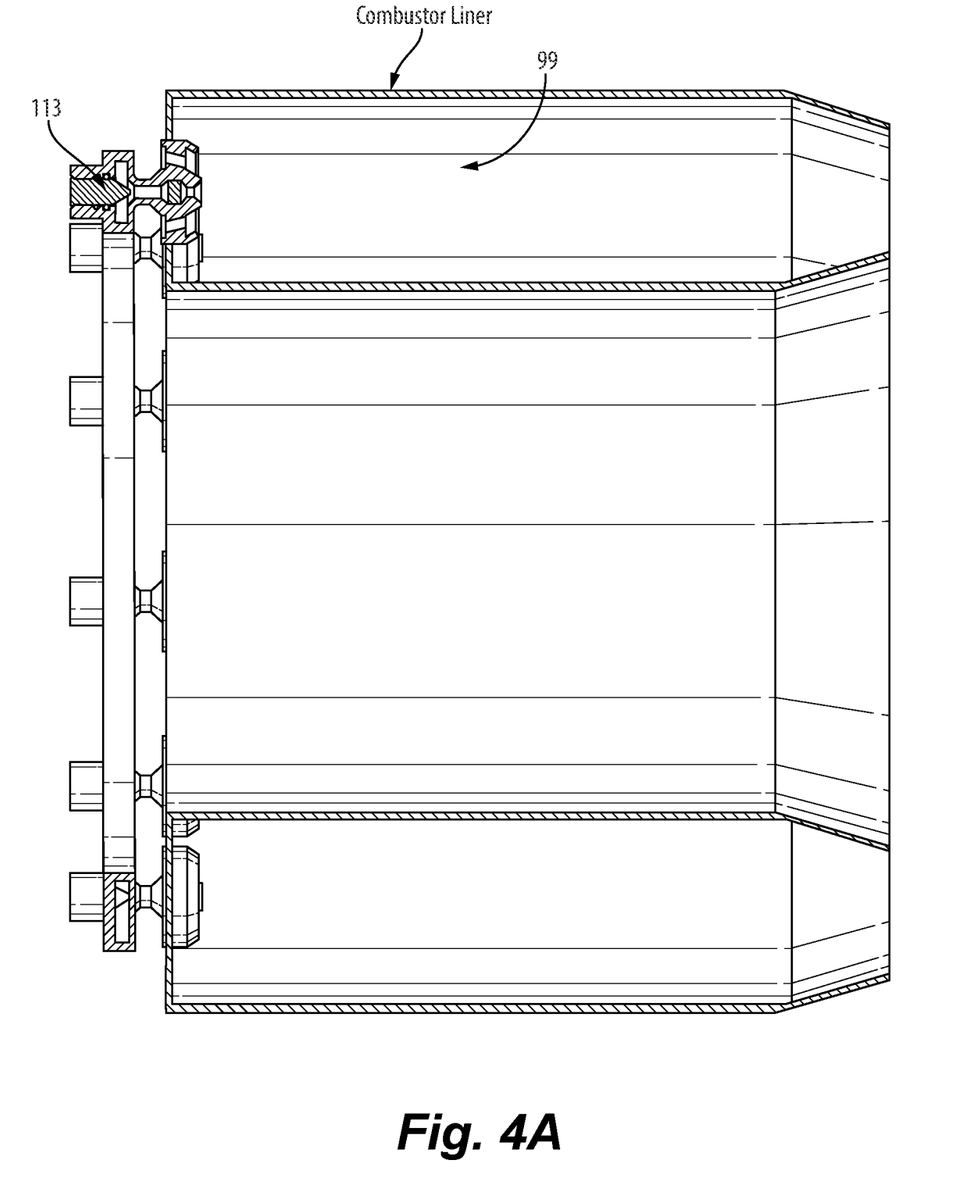
FIG. 4A is a cross-sectional view of a combustor assembly in accordance with this disclosure, shown having a single ring manifold with the embodiment of FIG. 1.
Figure 4B:
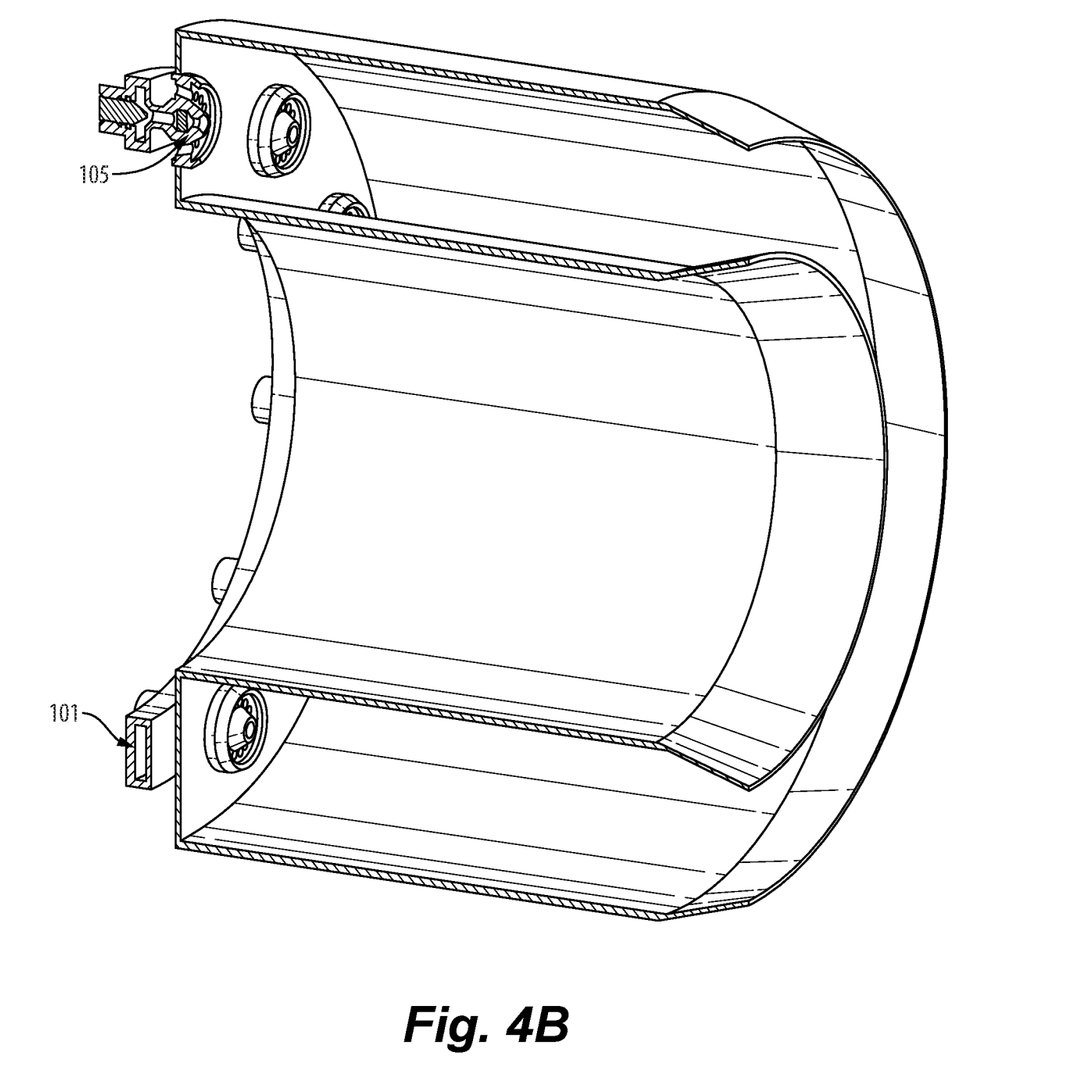
FIG. 4B is a perspective view of the embodiment of FIG. 4A.
Figure 5:
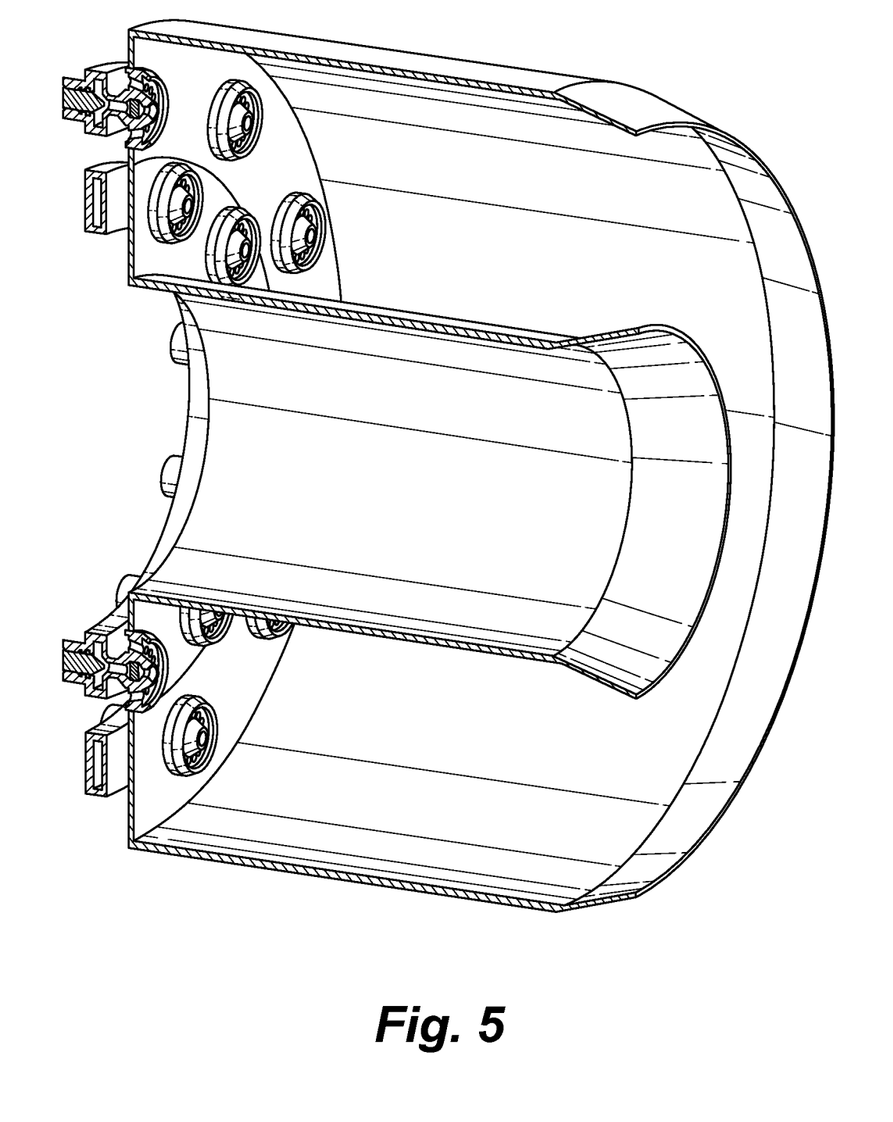
FIG. 5 is a cross-sectional view of a combustor assembly in accordance with this disclosure, shown having a plurality of ring manifolds with the embodiment of FIG. 1.

Any of the embodiments can be press fit, but may be threaded and sealed instead. Embodiments can be applied as a single row (e.g., ring) of injectors as shown in FIGS. 4A and 4B. Embodiments can be applied to any number of injectors or manifolds, e.g., multiple rows/rings of injectors and/or manifolds as shown in FIG. 5. For example, in a multipoint array of injectors, each nozzle can be individually trimmed. The manifolds can be separate or integral with each other and can share a single flow path or separate flow paths.

Embodiments can be used for internal manifolds (e.g., inside a high pressure case or external manifolds (e.g., outside of high pressure case) manifolds. Embodiments can be applied to multiple nozzles on a single stem, such as a tree manifold for multipoint designs.

Embodiments include trimming flows for fuel manifolds. It is advantageous to have a method to be able to adjust (e.g., calibrate) the flows to each individual injector in order to minimize variations of flows from injector to injector. Embodiments include a method where each injector tip can be individually adjusted to a suitable flow rate, and that flow rate can be fixed so it doesn't change anymore. Embodiments include a variety of calibration methods.

Embodiments allow achievement of consistent flow rates to each individual injector on a fuel manifold, despite tolerances achievable for internal flow passages with current additive manufacturing. This can lead to turbine and combustor life improvements.

Those having ordinary skill in the art understand that any numerical values disclosed herein can be exact values or can be values within a range. Further, any terms of approximation (e.g., "about", "approximately", "around") used in this disclosure can mean the stated value within a range. For example, in certain embodiments, the range can be within (plus or minus) 20%, or within 10%, or within 5%, or within 2%, or within any other suitable percentage or number as appreciated by those having ordinary skill in the art (e.g., for known tolerance limits or error ranges).

The articles "a", "an", and "the" as used herein and in the appended claims are used herein to refer to one or to more than one (i.e., to at least one) of the grammatical object of the article unless the context clearly indicates otherwise. By way of example, "an element" means one element or more than one element.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of."

Any suitable combination(s) of any disclosed embodiments and/or any suitable portion(s) thereof are contemplated herein as appreciated by those having ordinary skill in the art in view of this disclosure.

The embodiments of the present disclosure, as described above and shown in the drawings, provide for improvement in the art to which they pertain. While the subject disclosure includes reference to certain embodiments, those skilled in the art will readily appreciate that changes and/or modifications may be made thereto without departing from the spirit and scope of the subject disclosure.

What is claimed is:

1. A fuel injector assembly, comprising:
a manifold defining a manifold channel;
a nozzle extending from the manifold, the nozzle configured to direct flow from the manifold channel into a combustor, the nozzle defining:
a fuel inlet open to the manifold channel;
a fuel outlet configured to be open to the combustor; and
a throat fluidly connecting the fuel inlet to the fuel outlet; and a trim device inserted into the manifold, wherein the trim device is configured to adjust flow between the manifold channel and the fuel inlet to adjust flow through the throat and out of the fuel outlet, wherein the manifold includes a trim opening configured to receive the trim device inserted therein, wherein the trim opening is coaxial and/or aligned with the throat of the nozzle, wherein the trim opening includes manifold threads, wherein the trim device includes trim threads configured to mesh with the manifold threads to axially position a plunger of the trim device within the manifold channel by rotating the trim device, wherein the plunger of the trim device includes a conical shape.

2. The assembly of claim 1, wherein the manifold and/or the trim device defines a seal cavity configured to receive a seal to seal between the trim device and the manifold to prevent flow from leaking through the trim opening.

3. The assembly of claim 2, further comprising a seal disposed in the seal cavity and sealing a perimeter of the trim device.

4. The assembly of claim 1, wherein the trim device includes a braze ring cavity for holding a braze ring to allow brazing of the trim device to the manifold.

5. The assembly of claim 1, wherein an exposed end of the trim device is welded to the manifold.

6. A fuel injector structure, comprising:
   a manifold defining a manifold channel, wherein the manifold includes a trim opening in fluid communication with the manifold channel, the trim opening configured to receive a trim device inserted therein, wherein the trim opening includes manifold threads configured to mesh with trim device threads of the trim device; and
   a nozzle integrally formed with and extending from the manifold, the nozzle configured to direct flow from the manifold channel into a combustor, the nozzle defining:
      a fuel inlet open to the manifold channel, wherein the trim opening is positioned on an opposite side of the manifold channel relative to the fuel inlet;
      a fuel outlet configured to be open to a combustor; and
      a throat fluidly connecting the fuel inlet to the fuel outlet, wherein the trim opening is coaxial and/or aligned with the throat of the nozzle.

7. A fuel injector assembly, comprising:
   a manifold defining a manifold channel;
   a nozzle extending from the manifold, the nozzle configured to direct flow from the manifold channel into a combustor, the nozzle defining:
   a fuel inlet open to the manifold channel;
   a fuel outlet configured to be open to the combustor; and
   a throat fluidly connecting the fuel inlet to the fuel outlet; and
   a trim device inserted into the manifold, wherein the trim device is configured to adjust flow between the manifold channel and the fuel inlet to adjust flow through the throat and out of the fuel outlet, wherein the trim device includes a calibrated orifice that is calibrated to provide a set flow to the throat of the nozzle, wherein the trim device extends across the manifold channel and inserts into a trim device aperture adjacent to the fuel inlet of the nozzle, wherein the trim device includes one or more radial openings in fluid communication with the calibrated orifice to fluidly communicate the manifold channel to the throat of the nozzle, wherein the calibrated orifice is pre-calibrated prior to insertion, or is abraded using abrasive flow to calibrate while inserted into the manifold.

* * * * *